May 7, 1963 — B. W. BRUNSON — 3,088,483
MILK HANDLING APPARATUS
Filed March 3, 1958 — 2 Sheets-Sheet 1

INVENTOR.
Bruce W. Brunson
BY
ATTORNEYS

May 7, 1963 B. W. BRUNSON 3,088,483
MILK HANDLING APPARATUS
Filed March 3, 1958 2 Sheets-Sheet 2

INVENTOR.
Bruce W. Brunson
BY
ATTORNEYS

United States Patent Office 3,088,483
Patented May 7, 1963

3,088,483
MILK HANDLING APPARATUS
Bruce W. Brunson, Grand Rapids, Mich., assignor to Werner Machinery Company, Grand Rapids, Mich., a corporation of Michigan
Filed Mar. 3, 1958, Ser. No. 718,626
7 Claims. (Cl. 137—355.12)

This invention relates to milk handling apparatus and more particularly to a tank and reel construction for supporting a milk tank and storing flexible hose or conduit connected to the tank.

Various devices and apparatus have been developed for enhancing the efficiency of handling milk. A great need exists for apparatus by which milk can be transported from the stanchions to the milk house. Various types systems have been proposed but the expensiveness of these systems has made them impractical, particularly for the smaller operator.

Milking systems have been proposed which transport the milk from a milking barn through a flexible hose to the milk house by using the same vacuum line used for milking. The present application pertains to a liquid handling apparatus utilizing a reel and tank combination which is especially well adapted to be used in such milking systems.

An object of this invention is to provide a mobile cart having a compact tank and reel assembly for storing the flexible hose.

Another object of this invention is to provide such a reel assembly in which the swivel joint between the hose and the tank is completely eliminated.

Another object of this invention is to provide a combination tank and reel assembly capable of storing the flexible hose in such a fashion that the entire system can be operated without encountering any fluid lock in the hose.

A further object of this invention is to provide a compact cart having a readily accessible and handy storage for the conduit or hose.

Other objects of my invention will become obvious upon reading the following specification in conjunction with the accompanying drawings, wherein:

FIGS. 4 and 5 are enlarged, fragmentary, sectional views of the brake mechanism partly in section.

Figure 1:
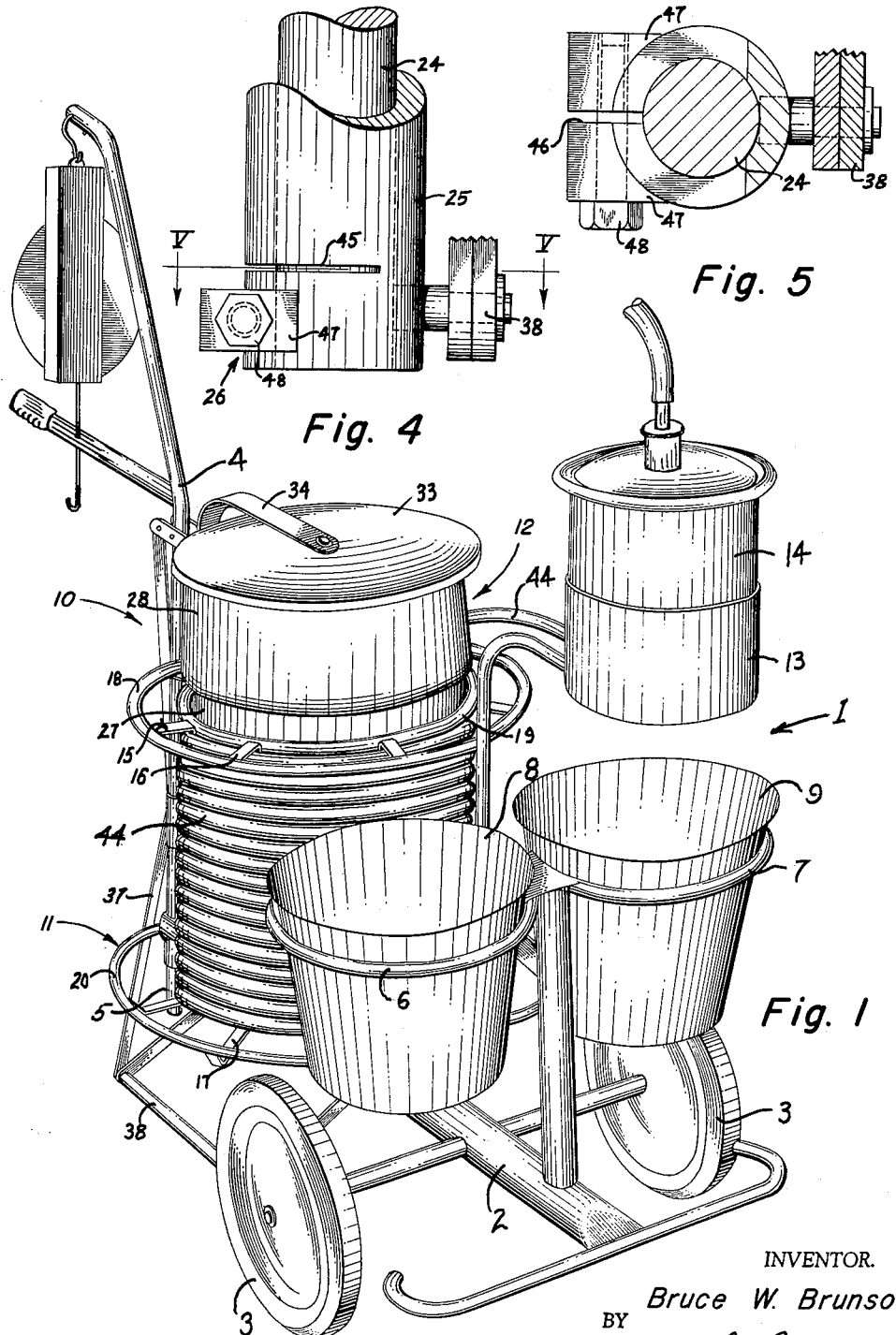
FIG. 1 is a perspective view of the overall cart of which the reel and tank assembly is a part.

Briefly this invention relates to milk handling apparatus including a cart frame supporting a tank, the tank being connected to a conduit for conveying milk from the tank to remotely located storage containers. The improvement of this invention lies in a conduit reel rotatably mounted about a vertical axis on the cart frame. The reel has a central opening surrounded by a conduit receiving portion. The tank is received by the opening whereby the reel surrounds the tank for receiving and winding the conduit substantially horizontally about the tank.

Referring to the drawings, reference numeral 1 designates the overall cart including a frame 2 supported on the wheels 3 at the front of the frame. The frame has an upright handle 4 at its rear with a brake foot 5 at its lower end resting directly on the floor to prevent the cart from rolling away. At the front of the frame are two circular rings 6 and 7 for receiving and supporting the pails or buckets 8 and 9. Between the handle 4 and the ring supports 6 and 7 is the reel and tank assembly 10 which includes the reel 11 and the tank 12. Also pivotally mounted on the frame between rings 6 and 7 is the bracket 13 for supporting a pump and releaser mechanism 14 of the type like that shown in the Hope Patent 2,895,450, July 21, 1959. This arrangement of the pump and releaser mechanism bracket is described in more detail in another application specifically relating to this feature. Briefly, it is adapted to be pivoted to positions over each of the pails and also over the tank when the strainer, described hereinafter, is removed.

Figure 2:
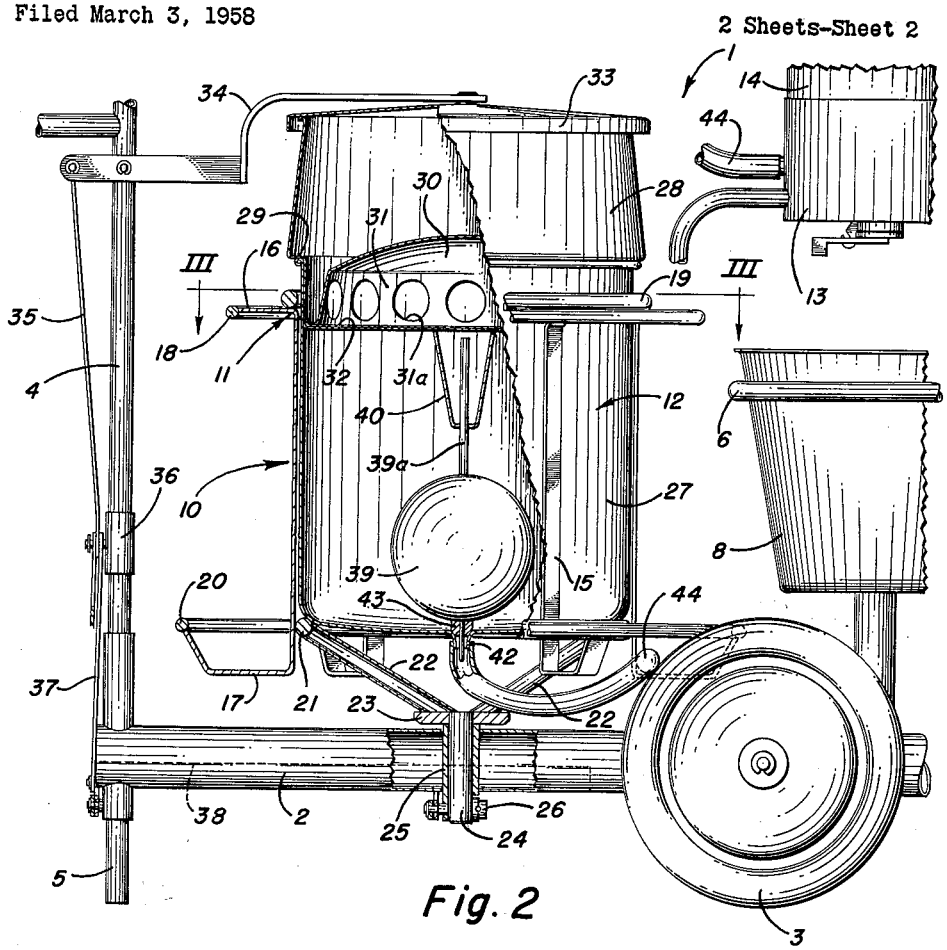
FIG. 2 is a side elevational view, partially sectioned to show in more detail the construction of the reel and tank assembly of this invention.
Figure 3:
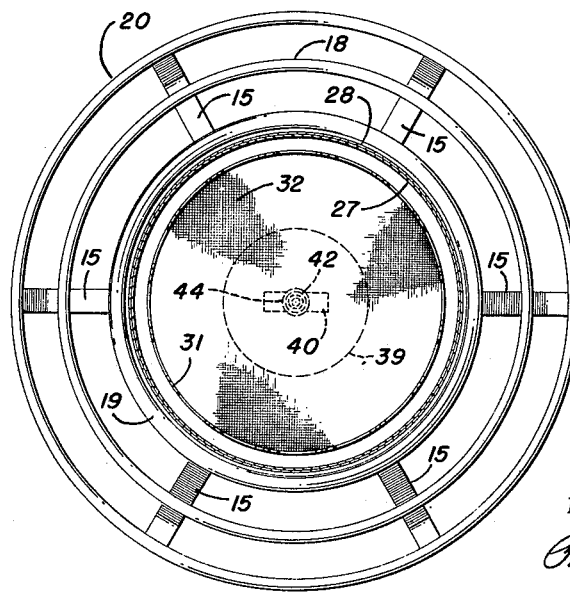
FIG. 3 is a cross sectional view taken along the plane III—III of FIG. 2.

Although FIG. 1 shows the overall cart, it should be understood that this invention relates to the features of the reel and tank assembly which is shown in more detail by FIGS. 2, 3 and 4. Referring to these figures it will be noted that the reel 11 is constructed of a plurality of web members 15 extending in a vertical direction from the frame and having the bent portions or ends 16 and 17. The web members 15 are arranged in a circle forming a hub on which the hose is wound. The top bent end 16 extends in a direction radially of the axis of the circle. The lower end 17 extends in the same direction but is bent or cupped upwardly to more definitely support the hose. At the top of web members 15 is located an outer ring 18 and an inner ring 19. The outer ring 18 is secured to the extreme end of the bent portion 16. Ring 19 is securely attached to the top of bent portions 16 immediately adjacent the bend. This inner ring is of sufficient size to receive the pot of the tank 12.

At the lower ends of the web members are the outer ring 20 and inner ring 21, the outer ring being secured at the extreme ends of the bent portions 17. The inner ring is secured to the inside of each of the web members providing, as will be described hereinafter, a support for the tank 12. Attached to the inner ring 21 and inclined downwardly and inwardly toward the axis of the circle on which the web members are located are the tubular members or spokes 22 which at their lower ends are rigidly attached to an axle support plate 23. Connected to and extending downwardly from the plate 23 is the reel support axle or shaft 24 rotatably mounted in the bearing of bushing 25. A tension brake 26 is located at the lower end of the bushing 25 for exerting tension on the reel. This tension brake structure comprises a lateral slit 45 (FIG. 4), located a short distance above the lower end of bearing 25, and a longitudinal slit 46 extending from the lower bearing end to slit 45. On each side of slit 46 are the blocks 47 one being tapped and the other bored for receiving a screw 48. The screw when tightened draws the walls of the lower end of the bearing together to frictionally engage the shaft 24. This prevents the reel from freely coasting.

From the above description it should be obvious that this reel is rotatably mounted on a vertical axis on the frame 2, and has a central opening for receiving a cylindrical tank. The bent ends of the web members form the flanges for containing or retaining a flexible hose on the reel.

The tank 12 of this invention includes a cylindrical pot 27 received in the central opening of the reel. This pot extends through the upper inner ring 19 and rests on the lower inner ring 21. The open top end of the pot 27 removably receives a strainer 28 having radially extending shoulders 29 resting on the top edge of the pot. The strainer 28 has a strainer shield 30 which is a dome shaped element having the side walls 31 with openings 31a. Beneath this strainer shield is a sheet 32 of strainer material which will strain the milk as it is poured into the top of the strainer and before it flows into the pot. The tank has a cover 33 for covering the top of the strainer 28.

Cover 33 is attached to an arm 34 pivoted on the handle 4. This arm is lifted by a lever 35 connected to the collar 36 which in turn is reciprocated downwardly by the lever 37 connected to the treadle 38. By this mechanism an operator can open the lid or cover with his feet facilitating the ease in pouring milk into the tank.

Inside the pot 27 is a float 39 secured to a float rod 39a the upper end of which is guided by an inverted U-shaped guide bracket 40. The lower end is guided by the nozzle or hose connection 42 extending downwardly from the pot. Immediately below the float is a valve element 43 of proper size for shutting off communication between the nozzle and the inside of the tank, when the tank is empty. This prevents and stops drawing of air through the hose which is connected to the vacuum line. Connected to the nozzle is the flexible hose 44 which is adapted to be wound on the reel, as shown in FIG. 1, so that it is arranged substantially horizontally.

*Assembly*

This equipment is easily fabricated and assembled. The frame is fabricated of tubular stock as is described in more detail in another patent application. The wheels are secured to the axle of the frame in any well known manner. The other mechanisms including the cover lifting mechanism, operated by the treadle, and the bracket for the vacuum pump and release mechanism are all fabricated and assembled in a manner which is described in more detail in other patent applications. These features are not described in detail since they are considered unimportant to this invention.

The reel is easily fabricated by forming the web members and then attaching them to the rings, in the manner shown, by welding or any other suitable means. The spokes 22 and axle assembly, including plate 23 and axle 24, are attached to the ring 21 either before or after rings and web members are assembled. This completes the reel.

The reel is then mounted on the frame by inserting the axle through the bearing or bushing 25. The tension mechanism 26 is adjusted for exerting the desired tension on the reel. This adjustment is accomplished by tightening screw 48 until the proper tension on the reel is produced.

The pot 27 of the tank is fabricated in any well known manner as is the strainer, the strainer shield, and cover 33. This entire tank unit is inserted through the top ring 19 until the pot 27 rests on the bottom ring 21. The cover 33 is then attached to the arm 34.

One end of hose 44 is rigidly connected to the nozzle 42, this connection being possible since there is normally no movement between the reel and the tank. After connecting the other end of hose 44 to the pump and releaser mechanism 14, the assembly is ready for use.

*Operation*

The operation of this reel and tank assembly is simple. After the hose is connected to the pot 27 and to the pump and releaser mechanism 14 this mechanism is then located in the milk house above the storage containers for the milk. Then the cart is pushed to the stanchions where the cows are milked. As the cart is pushed away from milk house, the hose is unwound from the reel 11. In this unwinding operation, the entire reel and tank unit 10 rotates, thus there is no relative movement between the hose and the tank and as a result no swivel connection is necessary at the hose connection between the tank and the hose. This is important in one aspect of this invention since a swivel connection is less desirable from a sanitary point of view. In fact, approval by some milk inspection authorities is very difficult to obtain where there is any type of swivel connection since the possibilities of the milk accumulating in such connections and forming harmful bacteria is more likely.

At the various locations in the barn, the operator pours milk into the tank causing the float 39 to rise permitting the milk to be drawn through the hose to the pump and releaser mechanism located at the milk house where the milk storage containers are kept. The pump and releaser mechanism 14 pumps the milk from the tank 12 and dumps it into suitable containers such as bulk containers or milk cans.

When the entire milking operation is completed the cart is returned to the milk house and as it is returned the flexible hose is wound on the reel by rotating the reel and the housing. In this operation again there is no relative movement between the flexible hose and the tank. At the milk house the vacuum pump and releaser mechanism 14 is placed in the bracket 13 and the entire unit is then ready to be cleaned. One way of cleaning this unit is to recirculate the cleaning fluid such as warm water or chlorine water through the tank and the vacuum pump and releaser mechanism 14. This is accomplished by removing the strainer 28 and pivoting the bracket 13 over the pots 27. During this operation the cleaning fluid passes through the entire hose which may consist of 200 or more feet. It is important during this operation and also during the pumping of milk, when a substantial portion of the hose is still on the reel, that the hose be maintained in a substantially horizontal position. We have found that if it is located in a vertical position fluid locking occurs; that is, the fluid becomes caught in a certain position in the hose, usually in the lower portion of each loop, which prevents the pump and releaser mechanism from circulating the fluid in the system. This invention alleviates such fluid locking because the hose is located in a horizontal plane.

It should be obvious from the above description of the tank and reel combination that it provides a compact unit. It also provides a readily accessible and handy storage for the conduit or hose which otherwise is quite unwieldy to handle. This invention provides a compact milk handling unit which eliminates fluid lock in the hose and any swivel joint connection between the hose and the reel. It provides a structure in which the hose is readily accessible, handy for storage, and easy to handle.

Although I have shown and described preferred modifications of this invention it should be understood that alterations and modifications thereof are possible within the broadest aspect. Therefore, this invention should be limited only as expressly set forth by the language of the appended claims.

I claim:

1. A mobile milk handling apparatus comprising a cart frame; wheels supporting said cart frame in a predetermined mobile position in which it is mobile in a direction dictated by the wheels; a tank support rotatably mounted on said cart frame; an elongated tank having an open top through which milk can be poured into said tank and having essentially a closed bottom with sides extending upwardly therefrom to said open top; a removable cover on said top; said tank being supported on said rotatably mounted tank support in a generally vertical position while said cart frame is in said mobile position; reel means associated with said tank and located at said sides around the tank; a hose for conveying milk from said tank to a remote location, said hose being coiled on said reel means around the tank and having one end interconnected with the inside of said tank, the position of the convolutions of said hose coiled on said reel means being in a generally horizontal position; said reel means, hose, and tank support being interrelated in such a way that the hose can be coiled on said reel means around said tank by rotating said tank support in one direction and said hose can be uncoiled from said reel means by moving said cart in a direction dictated by the wheels and exerting a pulling force on said hose causing the reel means to rotate in an opposite direction and uncoil the hose.

2. A mobile milk handling apparatus comprising a cart frame; wheels supporting said cart frame in a predetermined mobile position in which it is mobile in a direction dictated by the wheels; a reel rotatably mounted on said cart frame and having a hose receiving part extending vertically upwardly from said frame when it is in said predetermined mobile position, said reel having a central opening for receiving a tank within the hose receiving part; tank support means associated with said reel for supporting a tank upright in said opening; an elongated tank having an open top through which milk can be poured into said tank and having essentially a closed bottom with sides extending upwardly therefrom to said open top; a removable cover on said top; said tank being supported on said tank support means in a generally vertical position while said cart frame is in said mobile position; a hose for conveying milk from said tank to a remote location, said hose being coiled on said reel around the tank and having one end interconnected with the inside of said tank, the position of the convolutions of said hose coiled on said reel being in a generally horizontal position; said reel, hose, and tank support being interrelated in such a way that the hose can be coiled on said reel around said tank by rotating said reel in one direction and said hose can be uncoiled from said reel by moving said cart in a direction dictated by the wheels and exerting a pulling force on said hose causing the reel to rotate in an opposite direction and uncoil the hose.

3. The apparatus of claim 2 in which said tank has an outlet opening adjacent the bottom; said hose being connected to said outlet opening by a non-rotatable coupling.

4. A mobile milk handling apparatus comprising a cart frame; wheels supporting said cart frame in a predetermined mobile position in which it is mobile in a direction dictated by the wheels; a tank support rotatably mounted on said cart frame; an elongated tank having an open top through which milk can be poured into said tank and having essentially a closed bottom with sides extending upwardly therefrom to said open top; a removable cover on said top; said tank being supported on said rotatably mounted tank support in a generally vertical position while said cart frame is in said mobile position; reel means associated with said tank and located at said sides around the tank; a hose for conveying milk from said tank to a remote location, said hose being coiled on said reel means around the tank and having one end interconnected with the inside of said tank to an outlet opening adjacent the bottom thereof, the position of the convolutions of said hose coiled on said reel means being in a generally horizontal position; said hose connected to said outlet opening by a non-rotatable coupling; said reel means, hose, and tank support being interrelated in such a way that the hose can be coiled on said reel means around said tank by rotating said tank support in one direction and said hose can be uncoiled from said reel means by moving said cart in a direction dictated by the wheels and exerting a pulling force on said hose causing the reel means to rotate in an opposite direction and uncoil the hose.

5. A mobile milk handling apparatus comprising a cart frame; wheels supporting said cart frame in a predetermined mobile position in which it is mobile in a direction dictated by the wheels; a reel rotatably mounted on said cart frame and having a hose receiving part extending vertically upwardly from said frame when it is in said predetermined mobile position, said reel having a central opening for receiving a tank within the hose receiving part; said reel comprising several web members arranged vertically in a circle forming a hub, a top ring connected to the upper end of said web members and located outwardly of said web members, and a bottom ring connected to the lower ends of said web members and located inwardly of said web members, said bottom ring forming the tank support means; tank support means associated with said reel for supporting a tank upright in said opening; an elongated tank having an open top through which milk can be poured into said tank and having essentially a closed bottom with sides extending upwardly therefrom to said open top; a removable cover on said top; said tank being supported on said tank support means in a generally vertical position while said cart frame is in said mobile position; a hose for conveying milk from said tank to a remote location, said hose being coiled on said reel around the tank and having one end interconnected with the inside of said tank, the position of the convolutions of said hose coiled on said reel being in a generally horizontal position; said reel, hose, and tank support being interrelated in such a way that the hose can be coiled on said reel around said tank by rotating said reel in one direction and said hose can be uncoiled from said reel by moving said cart in a direction dictated by the wheels and exerting a pulling force on said hose causing the reel to rotate in an opposite direction and uncoil the hose.

6. A mobile milk handling apparatus comprising a cart frame; a tank having an open top through which milk can be poured into said tank and having essentially a closed bottom with sides extending upwardly therefrom to said open top; said tank being supported on said frame in a generally vertical position while said cart frame is in a mobile position; a hose for conveying milk from said tank to a remote location, one end of said hose interconnected to and communicating with said bottom of said tank; said hose coiled around said tank, the position of the convolutions of said hose being generally horizontal; a pump and releaser mechanism for drawing milk through said hose by means of a pressure differential; the other end of said hose interconnected to and communicating with said mechanism; and a support means on said cart frame for supporting and holding said mechanism above said top of said tank.

7. A mobile milk handling apparatus comprising a cart having a frame, a reel mounted on said cart frame for rotation about a substantially vertical axis, a milk-receiving tank mounted on the reel and rotatable therewith, said tank having an upper opening thereinto exposed to atmospheric pressure through which milk is introduced into said tank, a hose having the interior thereof exposed to sub-atmospheric pressure for conveying milk from said tank to a remote region, and means connecting one end of said hose in fixed relation to the lower interior regions of said tank, said connecting means being normally covered with the milk in said tank and said hose normally being coiled on said reel with the convolutions thereof disposed in a substantially horizontal plane, whereby air entrained in said hose with the milk therein may be readily drawn through the coiled hose by the differential pressure across the hose ends created by the atmospheric pressure in the tank above the milk therein and the sub-atmospheric pressure of the hose.

References Cited in the file of this patent

UNITED STATES PATENTS

| | | |
|---|---|---|
| 340,676 | Perkins | Apr. 27, 1886 |
| 570,237 | Spindler | Oct. 27, 1896 |
| 1,754,802 | Raster | Apr. 15, 1930 |
| 1,910,830 | Hapgood | May 23, 1933 |
| 2,015,127 | Rieger | Sept. 24, 1935 |
| 2,354,693 | Martin | Aug. 1, 1944 |
| 2,410,830 | Marsh | Nov. 12, 1946 |
| 2,518,990 | Keener | Aug. 15, 1950 |
| 2,560,059 | Young | July 10, 1951 |
| 2,595,655 | Hannay | May 6, 1952 |
| 2,608,951 | Kingston | Sept. 2, 1952 |
| 2,786,445 | Golay | Mar. 26, 1957 |

FOREIGN PATENTS

| | | |
|---|---|---|
| 110,047 | Australia | Mar. 7, 1940 |